United States Patent
Matsushita

[11] 3,762,516
[45] Oct. 2, 1973

[54] MAGNETIC CLUTCH

[76] Inventor: Takeyuki Matsushita, 6-14 Shimosueyoshi 1-chome, Yokama City, Kanagawa Prefecture, Japan

[22] Filed: Apr. 27, 1972

[21] Appl. No.: 248,103

[30] Foreign Application Priority Data
May 4, 1971 Japan.................. 46/29553

[52] U.S. Cl.............................. 192/84 C, 192/89 B
[51] Int. Cl............................................ F16d 27/10
[58] Field of Search.............. 192/84 A, 84 C, 89 B, 192/106.1

[56] References Cited
UNITED STATES PATENTS

| | | | |
|---|---|---|---|
| 3,368,657 | 2/1968 | Wrensch et al. | 192/84 C |
| 3,055,475 | 9/1962 | Pitts, Jr. | 192/84 C |
| 3,205,989 | 9/1965 | Mantey | 192/84 C |
| 3,425,529 | 2/1969 | Hayashi | 192/84 C |

Primary Examiner—Allan D. Hermann
Attorney—John J. McGlew et al.

[57] ABSTRACT

A magnetic clutch comprising a V-pulley revolvably mounted with a ball bearing on a boss which axially protrudes from a front panel, a magnet assembly connected to the front panel with a very small gap provided between itself and the V-pulley, and a clutch wheel disposed on the side of the pulley opposite to the side where the magnet assembly is located, face-to-face with the frictionally engaging surface of the pulley on that side and fixedly secured to a driven shaft, the clutch wheel and the driven shaft being connected together through a damper formed of an elastic metal plate by pressing.

2 Claims, 2 Drawing Figures

PATENTED OCT 2 1973

3,762,516

MAGNETIC CLUTCH

BACKGROUND OF THE INVENTION

This invention relates to a magnetic clutch for use principally with automotive engines.

A magnetic clutch used, for example, as an intermediary for the power transmission from a cooling fan shaft of an engine to the pump shaft of a cooler involves such a quick and percussive attraction of a friction disc by an excited magnet that noise and vibration cannot be controlled unless some suitable damping means is employed. For this reason, conventional magnetic clutches have been provided with either a relatively thick-walled annular ring of an elastic material, such as rubber, between the clutch wheel and the friction disc or a damper ring of a similar elastic material formed integrally with the periphery of the clutch wheel and disposed also integrally or face-to-face with the friction disc.

SUMMARY OF THE INVENTION

This invention has for its object to provide a magnetic clutch unlike the conventional ones above referred to, so constructed as to attain the frictional engagement by the attraction of a clutch wheel by a magnet provided on the front head of an engine, characterized in that the clutch wheel is equipped with a damper formed of a plate spring.

The magnetic clutch according to this invention is manufactured at a very low cost and is extremely simplified in construction because the damper, its principal component, can be made by blanking it out of a single elastic metal plate.

DETAIL OF THE INVENTION

Figure 1:
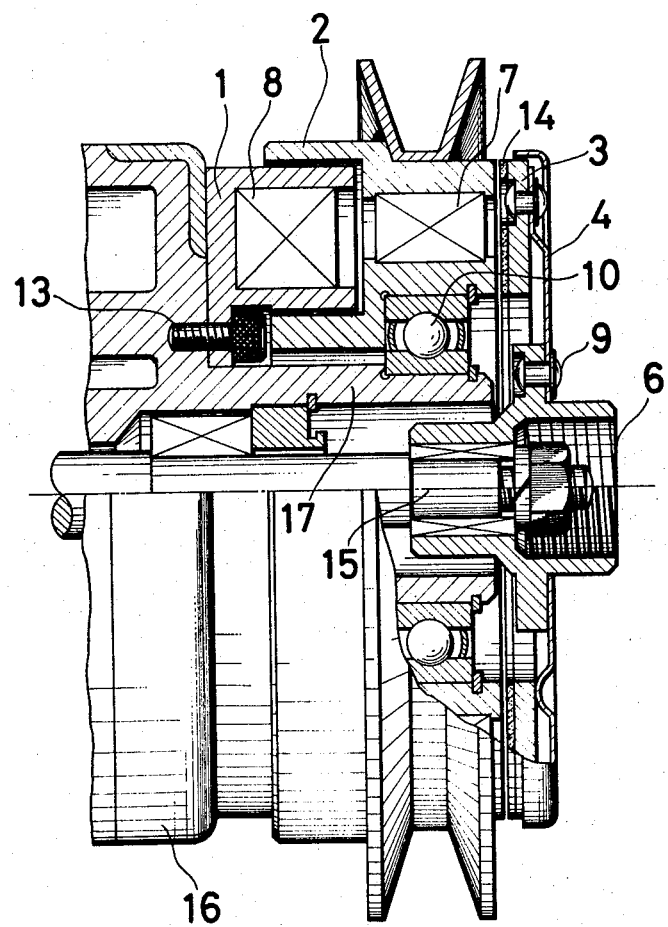
FIG. 1 is a side view, partly in section, of a magnetic clutch according to the present invention.

The present invention will be better understood from the following detailed description of an embodiment thereof as illustrated in the accompanying drawing. The reference numeral 1 indicates a magnet assembly of a ferromagnetic material such as mild steel, which accommodates a magnetizing winding 8 and is secured to a front head 16 by screws 13. With some gap provided radially and axially of the magnet assembly 1, a V-pulley wheel 2 is mounted on a boss 17 protruding from the front head, revolvably with a ball bearing 10. Although not shown in detail, the V-pulley wheel 2 consists of an outer ring carrying a V-pulley and an inner ring supported by the ball bearing 10. The two rings are integrally fastened to each other by a suitable number of locking pieces 7 of a nonmagnetic material, e.g., aluminum or an aluminum alloy, interposed circumferentially by press fitting or in other desirable way. A clutch wheel 3 is located opposite to the V-pulley wheel 2 and is provided with a clutch lining 14, e.g., of asbestos, in order to ensure positive frictional engagement of the two wheels. A shaft 15 for receiving the rotational force of the engine is disposed concentrically with the V-pulley wheel 2. The clutch wheel 3 and the shaft 15 are connected to each other by a damper 4, consisting of a plate spring, through a center boss or hub 6 which is fixed to the shaft 15 by key means.

The plate-spring damper 4, which is to function in the same way as a conventional rubber damper, must use a "soft" spring with a relatively low spring constant, or otherwise the damper would fail to effect smooth power transmission by absorbing the impact and noise of the instantaneous connection of the clutch elements. Moreover, the damper 4 is required to possess not only a spring characteristic in the axial direction but also an adequate flexibility in the frictional sliding direction perpendicular to the frictional contact plane, that is, in the revolving direction.

Figure 2:
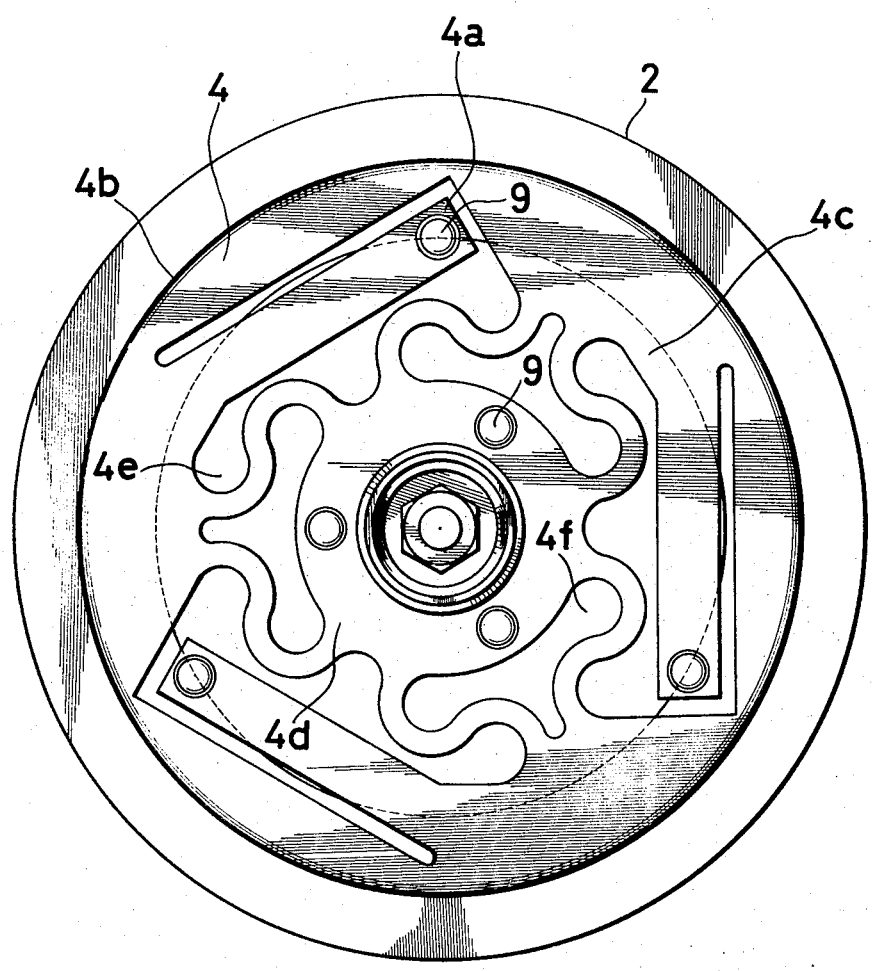
FIG. 2 is a front view of the clutch shown in FIG. 1.

FIG. 2 is a front view of an embodiment of the invention designed to fulfill the function required of a damper 4 of the plate spring type as above described. In this embodiment the damper 4 is formed by pressing a metal sheet which has a spring characteristic. The periphery 4b of the damper is bent rearwardly to surround the clutch wheel 3, whereas the center portion 4d is fixedly secured to the center boss 6 by rivets 9. The intermediate portion 4c is cut away by stamping, leaving only cantilever parts 4a behind, which confer an axial spring action on the damper means 4. The cantilever parts 4a are secured at their front ends to the clutch wheel 3 by rivets 9. Further, close to the cut-away parts 4e of the intermediate portion 4c, there are other cut-away parts 4f formed by stamping. Thus, by curving or bending the intermediate portion it is possible to impart to the damper means not merely an axial spring action but, in addition, an adequate flexibility in the direction of its sliding plane.

It is noted that the geometry of the damper 4 shown in FIG. 2 is a mere example of shape designed to give the damper desirable flexibility in the axial and rotational directions. Other geometries and mechanical constructions may be adopted for the disc-shaped plate spring of an elastic material, only if it permits smooth power transmission without shocks and vibrations.

It is also possible to use, in place of the single-plate structure as shown, a plate divided, for example in two pieces, in a suitable way.

In the embodiment being described, the V pulley wheel is composed of two members, i.e., inner and outer rings, and the two rings are fixed together by means of a suitable number of nonmagnetic members forced into the circumferential gap between the rings in order to provide an efficient magnetic path. As an alternative, the space between the two rings may be filled up with an annular member of nonmagnetic material so that the two rings can be secured in position as an integral assembly.

As described above, the magnetic clutch according to this invention uses a pressed, elastic metal plate as damper means for the clutch wheel, which simplifies the construction of the magnetic clutch as a whole and accordingly saves the production cost. In this way the present invention can make no small contribution to the automobile industry.

What is claimed is:

1. In a magnetic clutch including a V-pulley rotatably supported by an anti-friction bearing on a tubular boss extending from a front panel, a magnetic assembly secured to the front panel axially inwardly of the V-pulley and coaxially with the tubular boss and defining, with the V-pulley, a very small air gap, a clutch member adjacent the axially outer surface of the V-pulley and frictionally engageable therewith, and means securing the clutch member to a driven shaft coaxiallly within the tubular boss, the improvement comprising, in combination, a hub secured to said driven shaft; said clutch member being an annular member whose inner periphery is spaced radially from said hub; and a resilient metal stamping forming a plate spring damper, included in said securing means; said plate spring damper having an outer portion with an axially inwardly extending peripheral flange surrounding the periphery of said clutch member, a central portion secured to said hub, and an intermediate portion formed with cut-outs therein and interconnecting said outer and central portions; and cantilever fingers extending integrally from said intermediate portion and having free ends secured to said clutch member; whereby said damper has a spring action in the axial direction and flexibility in the diametric direction so that said damper absorbs shocks and vibrations during power transmission through said magnetic clutch.

2. In a magnetic clutch, the improvement claimed in claim 1, in which said cantilever fingers extend chordally from said intermediate portion and are located in respective cutouts thereof.

* * * * *